United States Patent [19]
Jacks

[11] 3,771,391
[45] Nov. 13, 1973

[54] STRUCTURE FOR AND METHOD OF MACHINING AN IRREGULAR CYLINDRICAL SURFACE

[75] Inventor: Roy T. Jacks, Warren, Mich.
[73] Assignee: North Tool and Mfg. Company, East Detroit, Mich.
[22] Filed: Mar. 22, 1971
[21] Appl. No.: 126,600

[52] U.S. Cl. .................................................. 82/19 R
[51] Int. Cl. ................................................ B23b 3/28
[58] Field of Search .......................................... 82/19

[56] References Cited
UNITED STATES PATENTS

| | | | |
|---|---|---|---|
| 2,906,156 | 9/1959 | Wheeler | 82/19 |
| 2,487,994 | 11/1949 | Trevena | 82/19 |
| 1,730,429 | 10/1929 | Jennings | 82/19 |
| 2,924,135 | 2/1960 | Pucci | 82/19 |
| 2,140,949 | 12/1938 | Bickel | 82/19 |

*Primary Examiner*—Harrison L. Hinson
*Attorney*—Whittemore, Hulbert & Belknap

[57] ABSTRACT

Structure for and a method of machining an irregular cylindrical surface. The structure includes chuck means for holding a workpiece for rotation about the axis of generation of an irregular cylindrical surface to be machined thereon, slide means for holding at least one tool in engagement with the workpiece surface to be machined and for movement of the engaged tool axially of the axis of generation of the surface to be machined, a rotatably mounted cam ring and a cam follower secured to the slide means and engaged with the cam ring and carrying the tool for moving the tool radially of the workpiece along with the axial movement thereof to define the surface to be machined, and means for synchronizing rotation of the cam ring and workpiece to duplicate the cam surface of the cam ring in the workpiece with a selected orientation in the workpiece.

5 Claims, 6 Drawing Figures

INVENTOR.
ROY T. JACKS
BY Whittemore
Hulbut & Belknap
ATTORNEYS

PATENTED NOV 13 1973 3,771,391
SHEET 2 OF 2
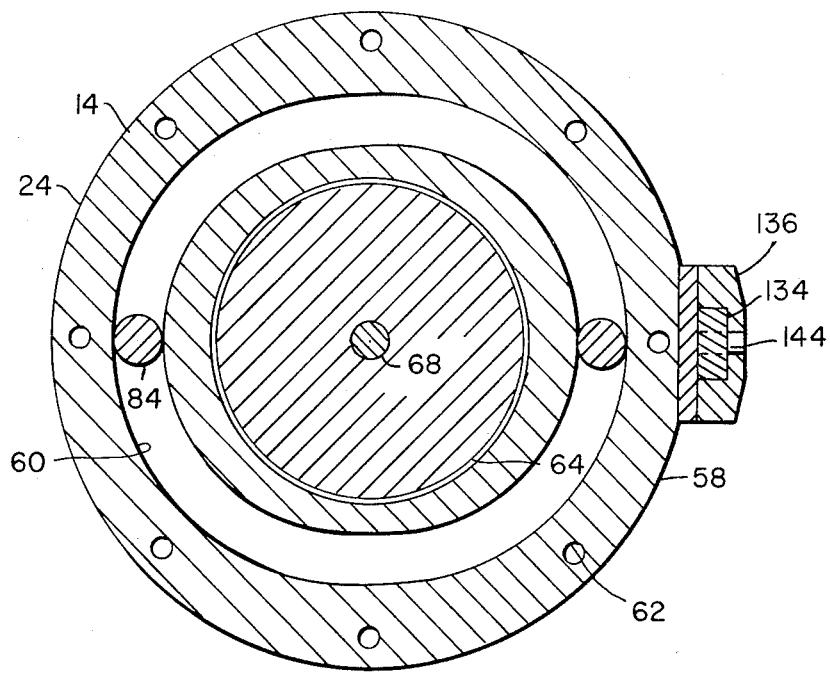
FIG. 3
FIG. 6
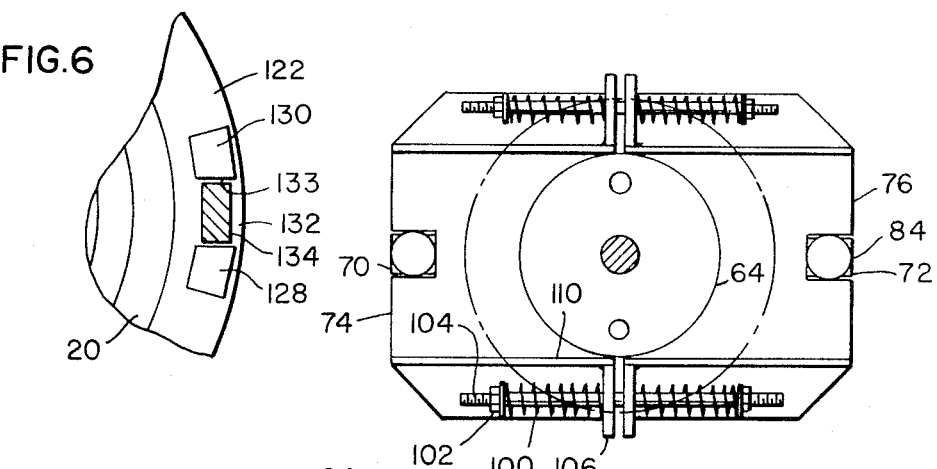
FIG. 4
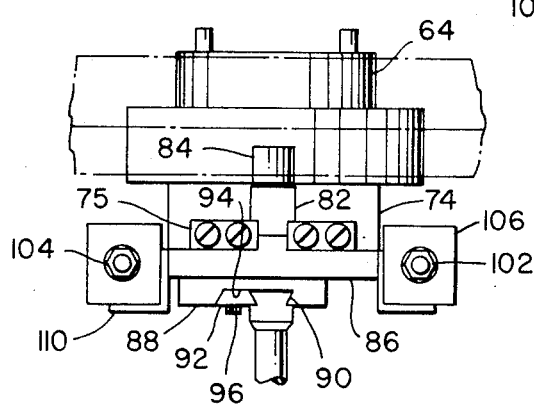
FIG. 5
INVENTOR
ROY T. JACKS
BY Whittemore
Hulbert & Belknap
ATTORNEYS 3,771,391

STRUCTURE FOR AND METHOD OF MACHINING AN IRREGULAR CYLINDRICAL SURFACE

BACKGROUND OF THE INVENTION

1. Field of the Invention

The invention relates to machining of metal and refers more specifically to a method of and structure for machining an irregular internal or external cylindrical surface in a workpiece with a cutting tool by synchronized rotation of the workpiece and a cam member for moving the cutting tool radially of the workpiece during axial movement of the cutting tool.

2. Description of the Prior Art

In the past, mechanical cutting of irregular cylindrical surfaces such as, for example, an internal ellipse on a workpiece, has been particularly difficult. Such surfaces have in the past required grinding and hand finishing operations in addition to the usual boring operations. Alternatively, such surfaces have sometimes in the past been formed by electroerosion machining requiring special equipment and often providing undesirable surface finishes. Thus, such surfaces have in the past been relatively expensive and time consuming to produce.

SUMMARY OF THE INVENTION

There is provided in accordance with the invention a method of and structure for boring irregular cylindrical surfaces such as ellipses or the like. The structure of the invention includes means for rotating a workpiece on which an irregular surface is to be machined and a tool for machining the irregular surface movable axially of the axis of generation of the irregular surface and means for moving the tool relative to the workpiece radially of the axis of generation of the surface to be machined during rotation of the workpiece.

The relative radial movement of the workpiece and tool are accomplished by means of a cooperating rotatable cam ring and tool carrying cam follower slide engaged with the cam ring. Means are provided for synchronizing the position of the workpiece and the cam ring for simultaneous rotation to orient the irregular cylindrical surface in the workpiece, including means for rotating the cam ring and workpiece at differential speeds until alignment thereof is attained and means for disengaging the drive for one of the cam ring and workpiece on alignment thereof.

BRIEF DESCRIPTION OF THE DRAWINGS

FIG. 3 is a cross section view of the structure illustrated in FIG. 1 taken substantially on the line 3—3 in FIG. 1.

FIG. 4 is a partial section view of the structure illustrated in FIG. 1 taken substantially on the line 4—4 in FIG. 1.

FIG. 5 is a partial section view of the structure illustrated in FIG. 1 taken substantially on the line 5—5 of FIG. 1.

FIG. 6 is a partial section view of the structure illustrated in FIG. 1 taken substantially on the line 6—6 in FIG. 1.

DESCRIPTION OF THE PREFERRED EMBODIMENT

Figures 1, 2:
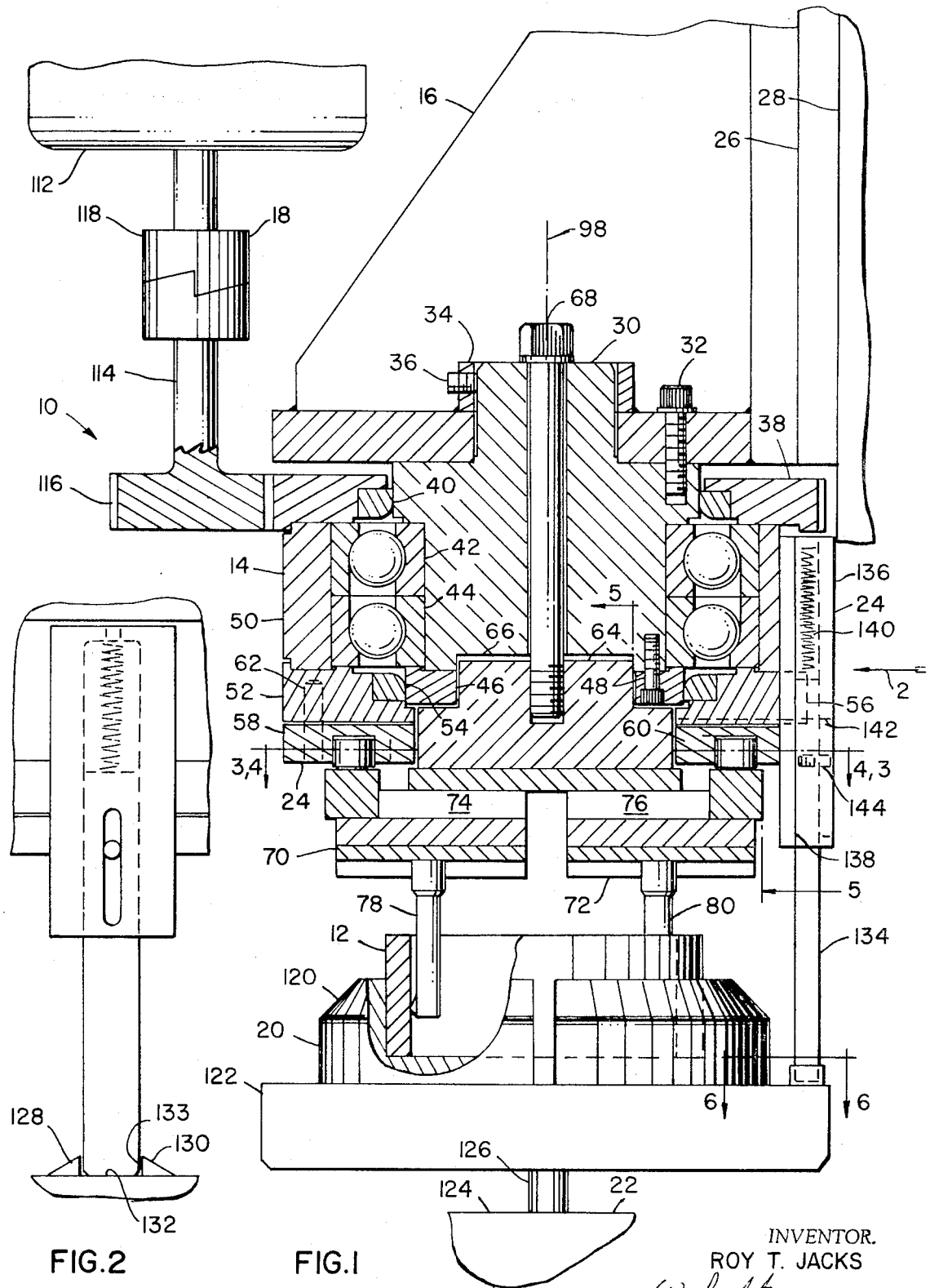
FIG. 1 is a partly broken away longitudinal sectional view of structure for machining an irregular cylindrical surface constructed in accordance with the invention.
FIG. 2 is a partial elevation view of the structure illustrated in FIG. 1 taken in the direction of arrow 2 in FIG. 1.

The structure 10 for machining an irregular cylindrical surface on a workpiece 12, as shown best in FIG. 1, includes the boring head 14 secured to a support 16 for movement axially of the axis of rotation thereof and drive structure 18 for initial rotation of a portion of the boring head 14. The structure 10 further includes the chuck 20 for holding the workpiece 12, drive means 22 for rotating the chuck 20, and the synchronizing structure 24 for synchronizing the rotation of the workpiece 12 and the cam ring 24 of the boring head 14.

The support structure 16 may be any convenient rigid support structure and may, for example, be one spindle of a multispindle Bullard machine which includes mechanism for moving the support 16 on a slide 26 axially of a central column 28 of the Bullard machine, which is also axially of the axis of rotation of the boring head 14. Such multiple spindle Bullard machines are well known and will not be considered in detail herein.

The boring head 14 includes the pilot part 30 secured to the support member 16 by means of bolts 32. The pilot part 30 is further positioned on the support member 16 by means of the collar 34 and set screw 36.

An upper drive gear 38 including a bearing ring 40 around the internal diameter thereof and the bearings 42 and 44 are secured to the pilot part 30 by means of a bearing ring 46. The bearing ring 46 is in turn secured to the pilot part 30 by convenient means such as bolts 48.

An outer bearing race member 50 is secured to the outer races of the bearings 42 and 44. The upper drive gear 38, outer bearing race member 46 and a lower drive ring 52 having the bearing ring 54 about the internal diameter thereof are secured together for rotation by convenient means such as bolts (not shown). The lower drive ring 52 includes a portion 56 extending into the synchronizing mechanism 24 for rotation therewith.

A cam ring 58 including the annular cam recess 60 in the lower surface thereof, as illustrated in FIG. 1, is secured to the lower drive ring 52 by convenient means such as pins 62.

An annular slide retainer 64 is secured in recess 66 in the pilot part 30 by means of the bolt 68 extending through the pilot part 30. The separate cam follower slides 70 and 72 are secured to the slide retaining member 64 by means of the slideways 74 and 76 secured to the slide retaining member 64 by convenient means such as bolts (not shown). Bearings 75 are provided between the slides 70 and 72 and the slideways 74 and 76 to facilitate radial movement of the tools 78 and 80 secured to the slides 70 and 72, respectively.

Since the slides 70 and 72 are identical, only slide 70 will be considered in detail. Slide 70 includes the T-shaped member 82 to which the cam roller 84 positioned in the annular cam recess 60 in the cam plate 58 is rotatably secured and the inverted T-shaped member 86 secured to the T-shaped member 82 for sliding movement along the bearings 75. A mounting plate 88 is bolted to the inverted T-shaped plate 86 and the tool 78 is secured to the mounting plate 88 by means of a dovetail adaptor 90 on the end of the tool 78 and the wedge member 92 positioned in the recess 94 in the mounting plate 88 and secured thereto by means of the bolt 96.

As shown best in FIG. 4, the slides 70 and 72 are biased radially inwardly of the axis of rotation 98 of the boring head 14 by the spring means 100 acting at one end against the bolt 102 secured to the elongated screw 104 and at the other end against the plate 106 connected to the angle members 110 which are in turn secured to the inverted T-shaped slide member 86. The angle members 110 and plate 106 are connected by convenient means such as welding or the like.

In operation of the boring head 14 on actuation of the drive means 18, outer bearing race member 50, the outer race of bearings 42 and 44, and the lower drive ring 52 together with the cam plate 58 are rotated together. The cam follower rollers 84 are thus moved radially of the axis 98 in accordance with the contour of the radially inner surface of cam recess 60 in the cam plate 58 to move the slides 70 and 72 and thus the boring tools 78 and 80 secured thereto in a similar radially varying pattern about the axis 98. Rotation of the cam plate 58 and the upper drive gear 38 and outer bearing race member 50 will also occur on rotation of the lower drive ring 52 through the synchronizing mechanism 24 as will be considered subsequently to again move the boring tools 78 and 80 radially of the axis 98.

The drive means 18 connected to the upper drive gear 38 includes a motor 112 for rotating drive shaft 114 and pinion 116 secured to the drive shaft 114 on rotation of the motor 112 in one direction. On rotation of the drive pinion 116 in mesh with the drive gear 38 at a speed greater than that of pinion 116 through the lower drive ring 52, the motor 112 is disconnected from the drive pinion 116 by means of the one-way clutch 118.

The chuck structure 20 for mounting the workpiece 12 is axially aligned with the axis of rotation of the boring head 14 and includes the usual chuck jaws 120 operable on actuation by conventional structure (not shown) to externally grip the workpiece 12. Alternatively, of course, the chuck structure 20 could be internal chuck structure or chuck structure which is capable of both internal and external chucking. The chuck structure 20 is mounted for rotation about the axis 98 on the table 122.

The means 22 for rotating the chuck structure 20 and therefore the workpiece 12 includes the drive motor 124 and the drive shaft 126 rotated by the motor 124 and connected to the chuck structure 20 for rotation thereof.

The synchronizing structure 24 includes a pair of inclined planes 128 and 130 positioned on the table 122 for rotation therewith and defining therebetween a driving recess 132 as shown best in FIG. 2. The synchronizing mechanism 24 further includes the drive finger 134 and the drive finger cover 136 which includes an opening 138 therein for receiving the shank of the driving finger 134 for reciprocal movement thereof. The cover 136 is secured to the outer bearing race member 50 by convenient means (not shown) such as bolts. Spring 140 is provided in the opening 138 to bias the drive finger 134 toward the table 122, while the slot 142 in the drive finger cover 136 and the pin 144 in the drive finger 134 are provided to permit reciprocal movement of the drive finger 134 in the drive finger cover 136 under urging of the resilient means 140 while preventing removal of the drive finger 134 from cover 136.

Thus, in overall operation, when it is desired to machine, for example, an elliptical irregular cylindrical surface in the workpiece 12, a cam plate 58 having the desired surface as an internal diameter surface on the cam recess 60 therein is secured to the lower drive plate 52 with the support 16 in an upper position. The motor 112 is then started to rotate the drive gear 38 and thus the cam plate 58 through the outer bearing race member 50 and the lower drive ring 52 whereby the tools 78 and 80 are caused to move radially inwardly and outwardly in accordance with the elliptical cam surface in the recess 60. The motor 22 is also started so that the workpiece 12 is rotated, again about the axis 98 at a speed slightly higher than the speed at which the cam plate 58 is rotated. The support 16 is then moved toward the table 122.

The driving finger 134 of the synchronizing mechanism 24 thus engages the table 122, with the table 122 moving at a slightly higher rotational speed than the drive finger 134. The inclined plane 128 cams the drive finger 134 inwardly of the drive finger cover 136 in opposition to the spring 140 when the table 122 which is rotating faster than the drive finger 134 positions the cam member 128 beneath the drive finger 134. Subsequently, the drive finger 134 drops into the drive recess 132 under bias of the spring 140 and engages the end 133 of inclined plane 130. Subsequently, the drive finger 134 is driven at the speed of rotation of the table 122 whereby the lower drive ring 52 secured to the outer bearing race 50 and the upper drive gear 38 and pinion 116 are driven at the speed of the table 122. The motor 112 at this time is disconnected from the drive shaft 114 and the pinion 116 by means of the one-way clutch 118 and the drive of the cam plate 58 is through the drive finger 134. The drive of the cam plate 58 is thus synchronized with the drive of the workpiece 12 and the irregular surface to be machined in the workpiece 12 is oriented with regard to the cam surface of the camming recess 60 in the cam plate 58.

Subsequent downward movement of the support 16 will engage the tools 78 and 80 and will produce cutting of the irregular surface desired in the workpiece 12. On upward movement of the support 16, the drive finger 134 is ultimately removed from the drive recess 132 and the drive of the cam plate 58 is again accomplished by the motor 112.

While one embodiment of the present invention has been considered in detail, it will be understood that other embodiments and modifications thereof are contemplated by the inventor. Thus, the device of the invention need not be a boring tool and may produce an external as well as an internal irregular cylindrical surface or both at the same time by merely changing the position of the tools. In addition, the camming surface of the recess 60 may be changed to provide cutting of irregular cylindrical surfaces other than ellipses. It is the intention to include all embodiments and modifications of the invention as are defined by the appended claims within the scope of the invention.

I claim:

1. Structure for machining an irregular cylindrical surface on a workpiece comprising means for holding the workpiece, means for holding a machining tool in engagement with the surface of the workpiece to be machined, and means connected to at least one of the means for holding the workpiece and the means for holding the tool for rotating the workpiece and tool relative to each other about the axis of generation of the cylindrical surface, and means for moving at least one of the workpiece and tool radially with respect to the other during the relative rotation of the workpiece and tool comprising a rotatable cam ring having an irregular cylindrical recess therein, a slide, a cam follower secured to the slide and in engagement with the cam ring within the irregular cylindrical recess therein for movement thereby radially of the axis of generation on rotation of the cam ring, and means for connecting the one of the workpiece and tool to the slide for radial movement therewith.

2. Structure as set forth in claim 1 and further including means operably associated with the one of the means for holding the workpiece and the means for holding the tool and the cam ring for synchronizing rotation thereof.

3. Structure as set forth in claim 2 wherein the means for synchronizing the rotation comprises a drive finger secured to the one of the means for holding the workpiece and the means for holding the tool, and a locking recess on the other of the means for holding the workpiece and the means for holding the tool, said locking recess receiving the drive finger on movement of the workpiece into alignment with the tool due to the relative rotation threof.

4. Structure for machining an irregular cylindrical surface on a workpiece comprising means for supporting and rotating the workpiece, a slide positioned above the workpiece for radial reciprocation with respect to the axis of rotation of the workpiece, means supporting the slide and moving the slide axially with respect to the axis of rotation of the workpiece toward and away from the workpiece, a rotatable cam ring having an irregular cylindrical recess therein, means supporting the cam ring for rotation on the means supporting the slide, means for rotating the cam ring and cam follower structure secured to the slide and positioned within the irregular cylindrical recess therein for movement radially of the axis of generation of the workpiece on rotation of the cam ring to produce radial movement of a tool secured to the slide in engagement with the workpiece, and means operable between the means supporting the workpiece and the means supporting the cam ring for synchronizing the rotation thereof and workpiece.

5. Structure as set forth in claim 4, wherein the means for synchronizing the rotation of the means supporting the workpiece and the means supporting the cam ring comprises a drive finger secured to the means supporting the cam ring and a locking recess on the means supporting the workpiece, said locking recess receiving the drive finger on movement of the workpiece into a synchronized position with the cam ring due to relative rotation thereof.

* * * * *